United States Patent
Harm et al.

(10) Patent No.: US 10,046,270 B2
(45) Date of Patent: Aug. 14, 2018

(54) METHOD FOR OPERATING AN AIR-DRYING DEVICE FOR DRYING AIR, AIR-DRYING DEVICE FOR DRYING AIR AS WELL AS COMPRESSED AIR SYSTEM

(71) Applicant: Drägerwerk AG & Co. KGaA, Lübeck (DE)

(72) Inventors: Reiner Harm, Scharbeutz (DE); Kjer Martensen, Lübeck (DE); Marcel Busch, Lübeck (DE); Raimund Mödlhammer, Lübeck (DE)

(73) Assignee: Drägerwerk AG & Co. KGaA, Lübeck (DE)

( * ) Notice: Subject to any disclaimer, the term of this patent is extended or adjusted under 35 U.S.C. 154(b) by 74 days.

(21) Appl. No.: 15/206,700

(22) Filed: Jul. 11, 2016

(65) Prior Publication Data
US 2017/0014755 A1    Jan. 19, 2017

(30) Foreign Application Priority Data

Jul. 15, 2015   (DE) .................. 10 2015 008 993

(51) Int. Cl.
*B01D 53/26* (2006.01)
*B01D 53/04* (2006.01)
*B01D 53/30* (2006.01)

(52) U.S. Cl.
CPC ....... *B01D 53/261* (2013.01); *B01D 53/0423* (2013.01); *B01D 53/30* (2013.01); *B01D 53/0462* (2013.01); *B01D 2253/104* (2013.01); *B01D 2253/106* (2013.01); *B01D 2253/108* (2013.01); *B01D 2253/116* (2013.01);
(Continued)

(58) Field of Classification Search
CPC .. B01D 53/30; B01D 53/261; B01D 53/0423; B01D 53/0462; B01D 2253/104; B01D 2253/106; B01D 2253/108; B01D 2253/116; B01D 2258/06;
(Continued)

(56) References Cited

U.S. PATENT DOCUMENTS 3,533,221 A * 10/1970 Tamura ............. B01D 53/0476
                                                        95/105
3,808,773 A    5/1974 Reyhing et al.
(Continued)

FOREIGN PATENT DOCUMENTS

| DE | 20 64 137 B2 | 9/1971 |
| DE | 10 2012 019 700 B3 | 3/2014 |
| EP | 2 111 905 B1 | 3/2015 |

*Primary Examiner* — Frank Lawrence
(74) *Attorney, Agent, or Firm* — McGlew and Tuttle, P.C.

(57) ABSTRACT

A method for operating an air-drying device (10) and an air-drying device (10) are provided. The air-drying device (10) has at least one adsorption device (20) with a first adsorption section (21), a second adsorption section (22), an air feed line (11), an air removal line and an analysis unit (13). The first adsorption section (21) and the second adsorption section (22) can be used alternatingly to dry air (70). The air feed line (11) feeds air (70) to be dried and is connected to an inlet opening (24) of the adsorption device (20) in a fluid-communicating manner. The air removal line (12) removes dried air (70) and is connected to an outlet opening (25) of the adsorption device (20) in a fluid-communicating manner. A compressed air system (60) for providing compressed air (70) has such an air-drying device (10).

20 Claims, 2 Drawing Sheets

(52) U.S. Cl.
 CPC .... *B01D 2257/504* (2013.01); *B01D 2258/06* (2013.01); *B01D 2259/402* (2013.01); *B01D 2259/404* (2013.01); *B01D 2259/40086* (2013.01); *B01D 2259/4533* (2013.01); *Y02C 10/08* (2013.01)

(58) Field of Classification Search
 CPC .... B01D 2259/40086; B01D 2259/402; B01D 2259/404; B01D 2259/4533; Y02C 10/08
 USPC .......... 95/1, 8, 10, 11, 96, 117, 139; 96/109, 96/111, 121, 131, 132; 34/80, 472, 473
 See application file for complete search history.

(56) References Cited

U.S. PATENT DOCUMENTS

| | | | |
|---|---|---|---|
| 4,472,178 A * | 9/1984 | Kumar | B01D 53/0462 95/139 |
| 8,734,571 B2 * | 5/2014 | Golden | B01D 53/0462 95/106 |
| 2008/0148937 A1 * | 6/2008 | Rege | B01D 53/047 95/96 |
| 2009/0260518 A1 * | 10/2009 | Wright | B01D 53/0462 95/11 |
| 2014/0338425 A1 * | 11/2014 | Kalbassi | B01D 53/047 73/31.07 |

\* cited by examiner

METHOD FOR OPERATING AN AIR-DRYING DEVICE FOR DRYING AIR, AIR-DRYING DEVICE FOR DRYING AIR AS WELL AS COMPRESSED AIR SYSTEM

CROSS REFERENCE TO RELATED APPLICATIONS

This application claims the benefit of priority under 35 U.S.C. § 119 of German Application 10 2015 008 993.5 filed Jul. 15, 2015, the entire contents of which are incorporated herein by reference.

FIELD OF THE INVENTION

The present invention pertains to a method for operating an air-drying device for drying air as well as to an air-drying device for drying air, such an air-drying device having at least one adsorption device with a first adsorption section and with a second adsorption section, wherein the first adsorption section and the second adsorption section can alternatingly be used to dry the air, and an air feed line and an air removal line, wherein the air feed line for feeding air to be dried is connected to an inlet opening of the adsorption device in a fluid-communicating manner and the air removal line for removing dried air is connected to an outlet opening of the adsorption device in a fluid-communicating manner, and an analysis unit. Further, the present invention pertains to a compressed air system for providing compressed air with an air-drying device.

BACKGROUND OF THE INVENTION

Compressed air has many possible fields of application in modern technology. Compressed air is usually produced in a compressed air system from ambient air, which is processed and compressed in the compressed air system. Such processing may comprise especially the drying of the compressed air. One object of drying the compressed air is to reduce the moisture contained in the compressed air, especially to reduce the moisture to a defined residual value. Condensation of this moisture in the compressed air, triggered, for example, by a reduction of temperature and/or pressure, can be avoided thereby.

Air-drying devices, which often have especially an adsorption device, are used for such drying. The air to be dried is sent in such an adsorption device through a desiccant, which is arranged in an adsorption section. Moisture is extracted from the air by the desiccant by adsorption, and the air is dried thereby. Moreover, other components, especially, e.g., carbon dioxide, can also be extracted from the air by suitable desiccants. Thus, drying will hereinafter be defined as both an adsorption of moisture and an adsorption of additional air components, especially carbon dioxide. The adsorption of these air components is especially advantageous in areas in which especially high requirements are imposed on the compressed air provided in terms of composition, especially, e.g., in case of the medical use of compressed air.

The adsorption processes taking place in the desiccant end when the desiccant becomes saturated. Further adsorption of a component of the air being passed through is no longer possible in such case. The adsorbed moisture and the adsorbed air components is/are released again by the desiccant by a regeneration of the desiccant, during which, for example, the desiccant is heated and/or already dry air is introduced through the desiccant. The corresponding adsorption step can then be used again for carrying out a drying operation. Uninterrupted or at least essentially uninterrupted drying of air can be made possible by providing an adsorption device with at least two adsorption steps connected in a fluid-mechanically parallel manner. One of the two adsorption steps is always used to dry the air, while the other is in a regeneration phase or in an inoperative phase.

In prior-art air-drying devices, saturation of the desiccant is usually detected by determining the moisture content in the dried air after passing through the adsorption device or an adsorption section, for example, by dew point measurement. As a result, an adsorption section can be operated until an especially complete saturation of its desiccant with moisture, as a result of which long inoperative phases are obtained for the respective other adsorption section. An especially energy-saving operation of an air-drying device can be achieved hereby. However, this procedure has the drawback that, for example, limit values for other air components may be exceeded, especially already before a saturation of the desiccant with moisture has developed. This may lead to problems especially in relation to carbon dioxide, especially if an air-drying plant is used in the field of medicine.

SUMMARY OF THE INVENTION

Based on this state of the art, a basic object of the present invention is to at least partially eliminate these drawbacks. Therefore, an object of the present invention is to provide a method for operating an air-drying device, an air-drying device as well as a compressed air system, which provide for drying the air and provide dry air, which meets high requirements, especially in the field of medicine, regarding its composition, in an especially simple and favorable manner.

The above object is accomplished by a method for operating an air-drying device having the features according to one aspect of the invention, by an air-drying device having the features according to another aspect of the invention as well as by a compressed air system having the features according to still another aspect according to the invention. Further features and details of the present invention appear from the description and from the drawings. Features and details that are described in connection with the method according to the present invention also apply, of course, in connection with the air-drying device according to the present invention as well as the compressed air system according to the present invention and also vice versa, so that reference is and can always mutually be made to the individual aspects of the present invention concerning the disclosure.

According to a first aspect of the present invention, the object is accomplished by a method for operating an air-drying device for drying air, such air-drying device having at least one adsorption device with a first adsorption section and with a second adsorption section, wherein the first adsorption section and the second adsorption section can alternatingly be used to dry the air, an air feed line and an air removal line, wherein the air feed line for feeding air to be dried is connected to an inlet opening of the adsorption device in a fluid-communicating manner and the air removal line for removing dried air is connected to an outlet opening of the adsorption device in a fluid-communicating manner, and an analysis unit. A method according to the present invention comprises the following steps:

a) Feeding of air to be dried for drying in a first adsorption step, b) Determination of the carbon dioxide content of the air, c) Analysis of a result of the determination performed in step b) by the analysis unit, and d) ending the feed of air to be dried to the first adsorption section and feeding of air to be dried for drying in the second adsorption section, based on a result of the analysis performed in step c).

A method according to the present invention is configured for operating an air-drying device. As was already explained above, drying will hereinafter be defined as both the extraction of moisture and extraction of additional air components, especially carbon dioxide. The air-drying device has at least one adsorption device with a first adsorption section and with a second adsorption section. The adsorption sections may preferably have an identical or essentially identical configuration. Due to the possibility of operating the two adsorption sections alternatingly, which is achieved especially by the common air feed line and air removal line, an uninterrupted or at least essentially uninterrupted drying of air can be provided by the air-drying device. One of the two adsorption sections is used to dry the air and the respective other adsorption section is regenerated at the same time. The respective other adsorption section may, of course, also be in an inoperative phase after conclusion of the regeneration, as a result of which a marked reduction of the energy consumption of the air-drying device can be achieved., For example, measurements can be received by the analysis unit from sensors and analyzed, but a control of the air-drying device may also be performed, for example, by actuating valves. The analysis unit may, of course, also be integrated in the higher-level control unit, for example, of a compressed air system.

In a first step a) of a method according to the present invention, air to be dried is fed to the first adsorption section. The air to be dried flows as a result through the first adsorption section. Moisture and other air components, especially carbon dioxide, are extracted by adsorption from the air to be dried in this adsorption section. The air dried in this manner can then be fed to its intended location and consumed or used there.

The carbon dioxide content in the air is determined in step b) of a method according to the present invention. This may take place at different sites, especially also at a plurality of sites, of the air feed line in the air-drying device, preferably after the adsorption section used, but, for example, also in front of or in the adsorption section being used. The determination may, of course, also take place in an air line of a higher-level unit, for example, a compressed air system. The carbon dioxide content in the air, especially in the dried air, can be determined in this manner at any time.

Step c) of a method according to the present invention comprises an analysis of a result of the determination carried out in step b). This analysis is carried out especially by and in the analysis unit. It can be made possible in this manner to detect, for example, an excessively high carbon dioxide content. It can consequently be made possible by the analysis to trigger or take actions based on the determination carried out in step b).

It was surprisingly found in this connection that saturation of a desiccant used in the adsorption section concerning the absorption of carbon dioxide is reached more rapidly than is, for example, a saturation concerning the adsorption of moisture. Therefore, based on such a result of the analysis carried out in step c) for a saturation with carbon dioxide, provisions are made in step d) of a method according to the present invention for changing the adsorption section currently being used for drying the air. The control of the air-drying device, which is needed for this, may be carried out, for example, by and in the analysis unit. The feed of air to be dried to the first adsorption section is ended for this and the air to be dried is fed to the second adsorption section. The ending of the feed to the first adsorption section and the start of the feed to the second adsorption section may preferably take place simultaneously or at least essentially simultaneously. However, other time sequences, for example, ending before the start or vice versa, are, of course, also conceivable. By changing the adsorption section used for the drying, an adsorption section capable of adsorption can thus be provided for drying air at any time. After conclusion of step d) of the method according to the present invention, a method according to the present invention will preferably be run again beginning from step a), and the first adsorption section and the second adsorption section are now transposed. A closed circuit type operation of an air-drying device can be made available hereby. In particular, an air-drying device can thus be operated by a method according to the present invention such that dried air with a low carbon dioxide content can be produced at any time. Since saturation with carbon dioxide usually develops more rapidly than saturation with moisture or saturation with respect to the absorption of additional air components in the adsorption sections, a dry and clean air with low moisture content can be provided hereby in an especially simple and cost-effective manner.

Further, provisions may be made in a method according to the present invention for a determination of the water content in the dry air after the adsorption device also to be performed in step b). Moisture can be determined by such a determination in the dried air provided by the air-drying device. This determination as part of step b) of a method according to the present invention is automatically analyzed in step c) and forms a part of the basis for performing a change of the adsorption section being used in step d). It can thus be made possible in an especially simple manner to additionally also integrate the moisture content of the dried air in the control of the air-drying device. The analysis of the determination of the moisture content may, as an alternative and/or in addition, be a trigger for a change of the adsorption section being used. An even more reliable operation and even more constant properties of the dried air provided can thus be attained.

A method according to the present invention may also be configured such that a comparison with at least one limit value, especially with an upper limit value and/or lower limit value, is performed in the analysis in step c). A limit value may be, for example, specified, especially legally required value for a minimum and/or maximum content of an air component in the dried air. The fact that the limit value in question is exceeded or not reached can be detected by a comparison with a limit value in step c) of a method according to the present invention in an especially simple, rapid and reliable manner, and this can consequently be used in step d) of a method according to the present invention as the basis for performing a change of the adsorption section being used.

Moreover, provisions may be made in a method according to the present invention for taking into account short-term fluctuations in the determined content, especially by forming a mean value, in the analysis in step c). Such fluctuations in the determined content may occur, for example, due to a change in the operation of an air-drying device and/or of a higher-level unit, for example, a compressed air system. A change of the adsorption section used for drying, which is performed according to step d), shall be mentioned here as an example. Such short-term fluctuations occur for a short time only and therefore do not usually have an adverse effect on the quality of the dried air provided by the air-drying device. By taking these fluctuations into account, which are taken into account especially such that the time at which they occur is taken into account, these short-term fluctuations can be detected and especially ruled out as a basis for performing a change of the adsorption section being used. The needless performance of a change of the adsorption section being used can be avoided hereby. An especially preferred possibility of taking such fluctuations into account is, for example, to form a mean value. For example, mean value over time can be formed, or, for example, averaging may also be performed over minimum and maximum measurement results. Fluctuations may, of course, also be taken into account in an exclusion time window, in which case provisions may be made, for example, for ignoring fluctuations in the analysis in step c) if they were determined within an exclusion time window around a change of the adsorption section being used.

Further, a method according to the present invention may be configured such that the determination of the carbon dioxide content is carried out in the air feed line and/or in the air removal line. Especially good monitoring of the quality of the air provided by the air-drying device can be performed by determining the carbon dioxide content in the air removal line. By contrast, determination of the carbon dioxide content in the air feed line may already make it possible to monitor the air that is fed to the air-drying device of the adsorption device. If especially ambient air is dried in the air-drying device, the determination of the carbon dioxide content may, of course, already be performed directly in the ambient air being used. This also represents the determination of the carbon dioxide content in the air feed line in the sense of the present invention. In particular, a high or even excessively high carbon dioxide content can thus be detected in an especially timely manner. Both determinations may preferably be performed and analyzed in step c) of a method according to the present invention. An especially high level of safety can be attained hereby concerning the carbon dioxide content in the dried air provided by the air-drying device.

Further, provisions may especially preferably be made in a method according to the present invention for the air to be dried to be compressed prior to step a). The compression may be carried out, for example, outside, but, of course, also by a part of the air-drying device. As a result, compressed air can also be dried by a method according to the present invention and especially provided with a low carbon dioxide content and especially also with a low moisture content. Particularly versatile possibilities of use can be provided hereby for an air-drying device, which is operated by a method according to the present invention.

According to a second aspect of the present invention, the object is accomplished by an air-drying device for drying air, having at least one adsorption device with a first adsorption section and with a second adsorption section, wherein the first adsorption section and the second adsorption section can be used alternatingly to dry the air; an air feed line and an air removal line, wherein the air feed line for feeding air to be dried is connected to an inlet opening of the adsorption device in a fluid-communicating manner and the air removal line for removing dried air is connected to an outlet opening of the adsorption device in a fluid-communicating manner; and an analysis unit.

The air-drying device is configured for drying air, especially compressed air, and has at least one adsorption device with a first adsorption section and with a second adsorption section. The adsorption sections may have a preferably identical or at least essentially identical configuration. Drying of air continues to be defined as both the extraction of moisture and the extraction of additional air components, especially carbon dioxide. Due to the possibility of operating the two adsorption sections alternatingly, which is achieved especially by the common air feed line and air removal line, uninterrupted or essentially uninterrupted drying of air is provided by the air-drying device. One of the two adsorption sections is used to dry the air. The respective other adsorption section is at the same time in a regeneration phase or, after conclusion of the regeneration, also in an inoperative phase. A marked reduction of the energy consumption of the air-drying device can be achieved hereby. For example, measurements of sensors can be received and analyzed by the analysis unit, but a control of the air-drying device may also be performed, for example, by actuating valves. The analysis unit may, of course, also be integrated here in a higher-level control unit, for example, a control unit of a compressed air system.

According to the present invention, the air-drying device has at least one carbon dioxide sensor. The determination of the carbon dioxide content in the air in the air-drying device can be made possible thereby. Depending on where in the air feed line of the air-drying device the carbon dioxide sensor is arranged, it is possible to determine, for example, the carbon dioxide content in the air to be dried or in the already dried air. A plurality of carbon dioxide sensors may, of course, also be provided, especially at different locations in the air feed line of the air-drying device. The analysis unit of the air-drying device is configured to analyze the measurement results of the carbon dioxide sensor. Analysis means in the sense of the present invention especially that a carbon dioxide content outside the target range can be detected by the analysis unit. Based on this analysis, especially if the carbon dioxide content is detected outside the preset target range, a change of the adsorption section being used for drying the air can be performed in an air-drying device according to the present invention. A change means especially that the feeding of air to the adsorption section currently being used is ended and feeding to the adsorption section that is not currently being used is started. The ending and the start may take place here preferably simultaneously or at least essentially simultaneously, but, of course, also in any desired order. It was found, in particular, that a saturation concerning the absorption of carbon dioxide often occurs sooner in an adsorption section than a saturation of other air components, especially, e.g., the moisture content. Thus, an especially high quality of the dried air provided can be made possible by an air-drying device according to the present invention, in which a change of the adsorption section being used can be performed based on a carbon dioxide measurement. This is advantageous especially when an air-drying device according to the present invention is used in the field of medicine, because a low carbon dioxide content is also required for the air, especially compressed air, in this field, in addition to a low moisture content.

An air-drying device according to the present invention may be configured especially preferably such that the air-drying device is configured such that it can be operated according to the first aspect of the present invention. All the advantages that were described in detail in reference to a method for operating an air-drying device according to the first aspect of the present invention will thus also arise for an air-drying device that is configured such that it can be operated by such a method according to the first aspect of the present invention.

Provisions may also be made in another embodiment of an air-drying device according to the present invention for an equalizing volume to be arranged in the air removal line. The equalizing volume is connected especially to the air removal line in a fluid-communicating manner and especially preferably the dried air flows through it. An equalizing volume in the sense of the present invention is a cavity in an additionally arranged component, but especially also a section of the air removal line, where the flow cross section of the section is increased. Such an equalizing volume is thus preferably a passive element of the air removal line and dried air can, in particular, flow through it continuously. It is possible that short-term fluctuations will occur in the carbon dioxide content in the dried air. One possible cause may be, for example, a change from the adsorption section being used. Such a short-term fluctuation can, however, often be equalized again due to mixing with the rest of the air present in the air line system of the air-drying device and therefore it does not usually have any adverse effect on the quality of the dried air provided. The quantity of air needed for such mixing can be provided by an equalizing volume in an especially simple manner. Short-term fluctuations in the carbon dioxide content thus can be equalized especially simply and effectively by an equalizing volume. It is possible hereby to avoid the needless performance of a change of the adsorption section being used.

As an alternative and/or in addition, provisions may be made in an air-drying device according to the present invention for the carbon dioxide sensor to be arranged in the air removal line at a distance from the adsorption device. It can also be ensured by arranging the carbon dioxide sensor at a distance from the adsorption device that such a large volume of air is present in the air line of the air-drying device due to the carbon dioxide sensor being arranged at a distance from the adsorption device that mixing and equalizing of such a fluctuation can take place. The above-mentioned short-term fluctuations in the carbon dioxide content can thus also be equalized by such an arrangement of the carbon dioxide sensor at a distance from the adsorption device. It is therefore possible to avoid the needless performance of a change from the adsorption section being used in this embodiment of an air-drying device according to the present invention as well.

An air-drying device according to the present invention may also be configured such that the air-drying device has a sensor device for determining the content of at least one of the following components of the air:
water
oxygen
carbon monoxide
oil
sulfur dioxide
nitrogen oxide.

The contents of a plurality of these components may, of course, be determined as well. This list is also not a complete one, so that it is also possible to determine the contents of components in the air that are not included in the list. It can be made possible in this manner in an air-drying device according to the present invention to also determine the content of at least one additional component in addition to the carbon dioxide content. Provisions may, of course, be made in this connection to also analyze this determined content in and by the analysis unit and to base a change of the adsorption section being used on this, especially as an alternative and/or in addition to the analysis of the carbon dioxide content determined. An especially reliable operation of an air-drying device according to the present invention and an especially good quality of the dried air provided by an air-drying device according to the present invention can be attained hereby.

Further, provisions may be made in an air-drying device according to the present invention for at least one of the adsorption sections to contain a plurality of desiccants, the desiccants being arranged in the adsorption section arranged, in particular, in a layered manner. All adsorption sections preferably have a plurality of desiccants, especially a plurality of desiccants arranged in a layered manner. Different desiccants may especially be well suited for the adsorption of different components of the air to be dried. By using a plurality of desiccants, it is thus possible to create an adsorption section that has an especially good configuration for the adsorption of a plurality of different components of the air to be dried. On the one hand, the quality of the dried air provided by an air-drying device according to the present invention can be improved hereby. On the other hand, the use of a plurality of desiccants in an adsorption section makes possible an especially compact configuration of the entire air-drying device, because it is possible, in particular, to eliminate separate adsorption sections containing a desiccant each. In particular, the mixing of the individual desiccants can be prevented or at least limited by a layering of the desiccants in the adsorption section. The replacement of one of the desiccants can be simplified hereby, especially compared to an adsorption section containing mixed desiccants.

An air-drying device according to the present invention can preferably be perfected such that at least one of the desiccants used is selected from the following list:
molecular sieve
silica gel
activated alumina.

This list is incomplete, so that desiccants that are not included in the list may be used as well. By selecting the desiccant used, an air-drying device according to the present invention can be especially well adapted to a field in which it shall be used. An especially need-adapted configuration of an air-drying device according to the present invention can be provided hereby.

Further, provisions may especially preferably be made in an air-drying device according to the present invention for at least two adsorption devices to be provided and for the at least two adsorption devices to be arranged in a fluid-mechanically parallel manner and/or in series. In particular, the two adsorption devices may have an identical or at least essentially identical configuration. In addition to the obviously possible increase in the amount of dried air provided, the fail-safe operation of the air-drying device according to the present invention can be increased especially by the fluid mechanically parallel arrangement of the two adsorption devices. In case of failure of one of the two adsorption devices, the other can take over the drying of the air without delay and thus ensure the supply of dried air. By contrast, the drying capacity of the entire air-drying device can be increased in case of a fluid-mechanically serial arrangement. This may be advantageous especially in respect to drying in relation to the water and carbon dioxide contents, because provisions may, for example, be made for the first adsorption device adsorbing above all water and the second one being able to adsorb, based on this, above all carbon dioxide. It is thus possible to provide air that is, on the whole, even drier, especially in respect to the water content and the carbon dioxide content.

An air-drying device according to the present invention may also be configured such that a carbon dioxide absorber is arranged in the air removal line, the carbon dioxide absorber containing especially breathing lime. It can be made possible, in particular, by such a carbon dioxide absorber to further reduce the carbon dioxide content in the dried air. In particular, breathing lime is an especially suitable material for the absorption of carbon dioxide. It is possible thereby to reduce the carbon dioxide content in the dried air provided even more.

According to a third aspect of the present invention, the object is accomplished by a compressed air system for providing compressed air, having an air-drying device. A compressed air system according to the present invention is characterized in that the air-drying device is configured according to the second aspect of the present invention. All the advantages that were described in detail in reference to an air-drying device according to the second aspect of the present invention will thus also appear for a compressed air system that has such an air-drying device according to the second aspect of the present invention.

Further measures perfecting the present invention appear from the following description of some exemplary embodiments of the present invention, which are shown in the figures. All the features and/or advantages, including design details and arrangements in space, which appear from the claims, the description or the drawings, may be essential for the present invention both in themselves and in the different combinations. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
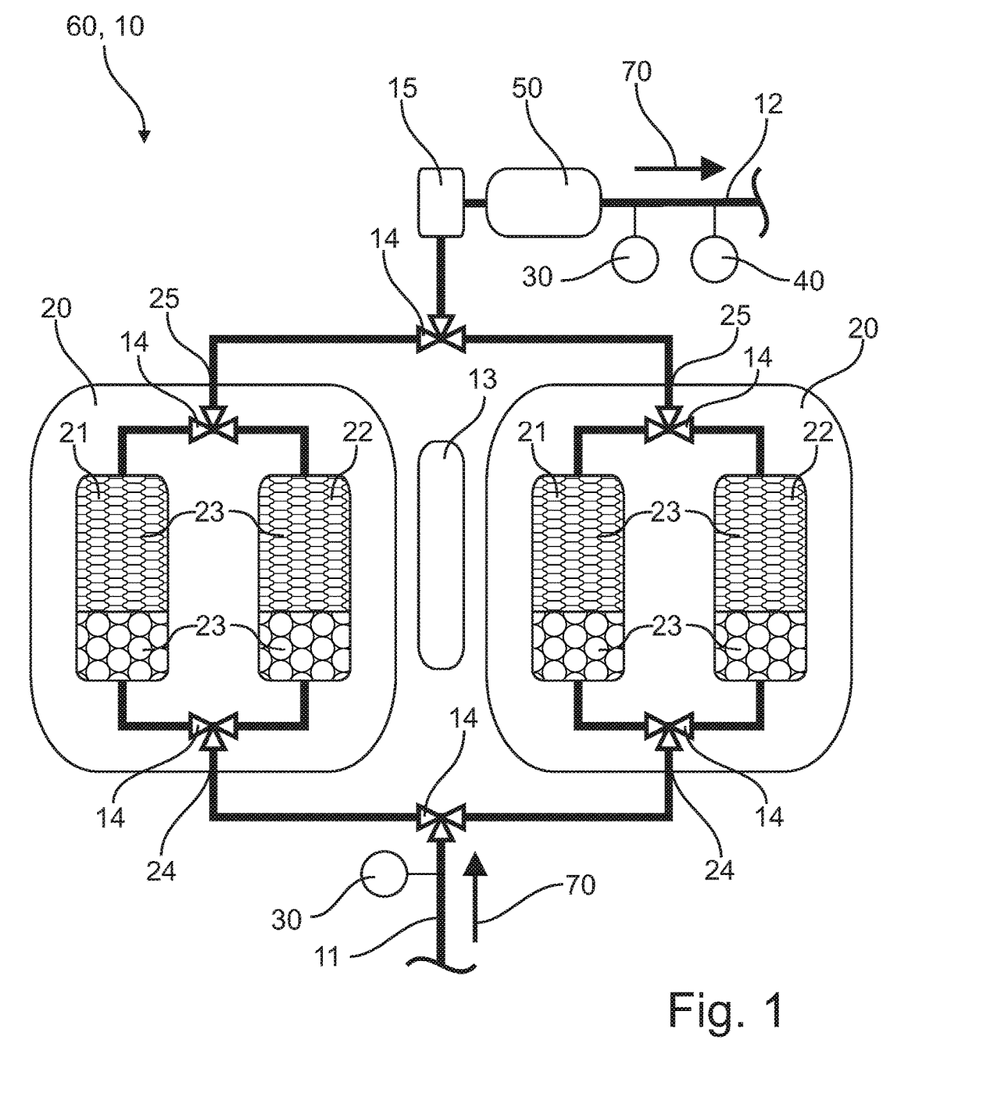
FIG. 1 is a schematic sectional view showing a first embodiment of an air-drying device according to the present invention.
Figure 2:
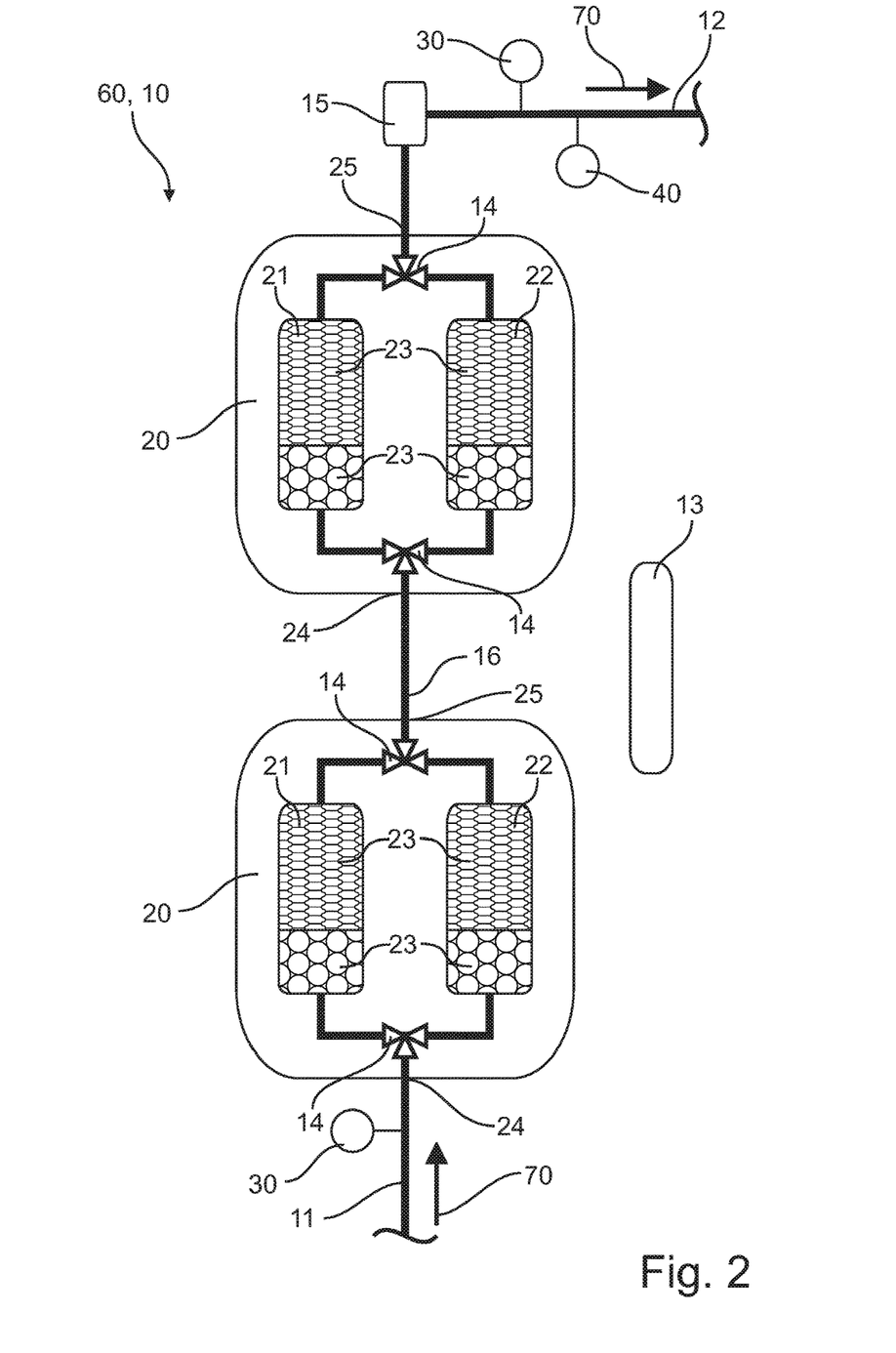
FIG. 2 is a schematic sectional view showing a second embodiment of an air-drying device according to the present invention.

Referring to the drawings, components having the same function and mode of action are always provided with the same reference numbers in FIG. 1 and FIG. 2.

FIG. 1 shows an air-drying device 10 of a compressed air system 60 according to the present invention. The air-drying device 10 has two adsorption devices 20, which are arranged in a fluid mechanically parallel manner. The quantity of dried air 70 provided can be increased in an especially simple manner here by operating both adsorption devices 20 simultaneously. If only one of the adsorption devices 20 is used to dry air 70, the respective other adsorption device 20 represents a fail-safe operation. The most uninterrupted possible operation of the air-drying device 10 according to the present invention can be ensured hereby.

The supply with air 70 to be dried is ensured by a common air feed line 11, and air 70 to be dried can be sent through a valve 14 to one of the two adsorption devices 20 or to both adsorption devices 20. The air feed line 11 is always connected for this to an inlet opening 24 of the respective adsorption device 20 in a fluid-communicating manner. The adsorption devices 20, in the shown embodiment of the air-drying device 10 according to the present invention, have an identical configuration and have each a first adsorption section 21 and a second adsorption section 22. The feeding of the air 70 to the individual adsorption sections 21, 22 is controlled and/or regulated by valves 14. Two desiccants 23 are arranged in a layered form in the adsorption sections 21, 22. The individual desiccants 23 may be especially suitable for the adsorption of a certain component of the air 70. An overall even better drying of the air 70 can be achieved thereby. The presence of two adsorption sections 21, 22, which especially have an identical configuration, makes it possible to always use one adsorption section 21, 22 for drying the air 70 and to regenerate the other adsorption section 21, 22 at the same time. The other adsorption section 22, 21 can, of course, be operated in an energy-saving inoperative mode after the conclusion of the regeneration. After the drying has been carried out in the adsorption device 20 or adsorption devices 20, air 70 is removed in a common air removal line 12, which is connected to a respective outlet opening 25 of the respective adsorption device 20 in a fluid-communicating manner. The control and/or regulation of the removal is again made possible by actuating valves 14. To equalize short-term fluctuations in the carbon dioxide content in the dried air 70, which may develop at the time of a change of the adsorption section 21, 22 being used, an equalizing volume 15 is arranged in the air removal line 12. The air 70 present in the equalizing volume 15 now acts as a buffer volume, which dilutes a short-term fluctuation in the carbon dioxide content by mixing and is thus able to equalize it. Further, a carbon dioxide absorber 50, which may contain especially breathing lime, is arranged in the air removal line 12. The carbon dioxide content in the dried air 70 provided can be reduced even more thereby.

The air-drying device 10 shown has, in addition to additional sensor devices 40, especially carbon dioxide sensors 30. The sensor devices 40 may be configured, for example, for measuring water, oxygen, carbon monoxide, oil, sulfur dioxide and/or nitrogen oxide. The carbon dioxide content in the air 70 can be determined by the carbon dioxide sensors 30. The measurement result of the carbon dioxide sensors 30 is sent to an analysis unit 13 and is analyzed in this. This has especially the advantage that saturation of at least one of the desiccants 23 of the adsorption section 21, 22 currently being used can be detected. The fact that a saturation concerning a possible adsorption of carbon dioxide often develops sooner than a saturation concerning other components of the air 70, especially a saturation concerning water.

Air 70 is fed to at least one of the adsorption sections 21, 22 during the operation of the air-drying device 10 according to the present invention. At the same time, the carbon dioxide content in the dried air 70 is determined with at least one of the carbon dioxide sensors 30, preferably with the carbon dioxide sensor 30 arranged in the air removal line 12. This determined content is analyzed in the analysis unit 13. An analysis may comprise especially a comparison with an upper limit value. If it is determined by the analysis unit 13 that this limit value is exceeded by the carbon dioxide content determined, saturation of at least one of the desiccants 23 of the adsorption section 21, 22 being used can be inferred. Based on this result of the analysis, the adsorption section 21, 22 being used is changed. A result of a determination of the content of an additional component of the air, for example, water, which is determined especially by a sensor device 40, may, of course, also be included in this analysis. By actuating the corresponding valves 14, the feed of air 70 to the adsorption section 21, 22 of the active adsorption device 20, which section is currently being used, is stopped and the feed of air 70 to the corresponding other adsorption section 22 is started. The stopping and starting may take place preferably simultaneously or at least essentially simultaneously, but also in any desired chronological order. A control or regulation of this change may be performed, for example, by the analysis unit 13. The respective other adsorption section 22, 21 is used in this manner for the drying operation and the adsorption section 21, 22 that is no longer being used can be regenerated. A repeated performance of these steps of a method according to the present invention with the now active adsorption section 221, 21 makes possible a closed-circuit type operation of an air-drying device 10 according to the present invention and as a result the essentially uninterrupted supply of dried air 70.

FIG. 2 shows another embodiment of an air-drying device 10 according to the present invention of a compressed air system 60. The individual components of the air-drying device 10 shown are essentially identical to the components of the air-drying device 10 shown in FIG. 1, so that mainly the differences between the two embodiments will be described below and reference will otherwise be made to the description given in connection with FIG. 1. Thus, the air-drying device 10 shown in FIG. 2 also has two adsorption devices 20. These adsorption devices 20 also have two adsorption sections 21, 22 each, which can alternatingly be used to dry the air 70. A change of the adsorption sections 21, 22 being used can again be carried out based on an analysis of the carbon dioxide content determined by a carbon dioxide sensor 30 in the air 70, which analysis is performed in an analysis unit 13. Further, an equalizing volume 15 is also arranged in this embodiment of an air-drying device 10 according to the present invention in the air removal line 12. A measurement result of an additional sensor device 40 is, of course also possible here during the analysis.

However, contrary to the embodiment shown in FIG. 1, the adsorption devices 20 are not arranged here in a fluid mechanically parallel manner but in series. In particular, one outlet opening 25 of one adsorption device 20 is connected to an inlet opening 24 of the other adsorption device 20 in a fluid-communicating manner via an intermediate air line 16. At least two adsorption sections 21, 22, one each of each of the two adsorption devices 20, are thus always participating in the drying of the air 70. The drying capacity of the entire air-drying device 10 can be increased thereby. This may be advantageous especially in respect to drying concerning the water content and the carbon dioxide content, because provisions may, for example, be made for the adsorption section 21, 22 being used of the adsorption device 20, through which the air flows first, absorbing above all water and for the adsorption section 21, 22 being used of the other adsorption device 20 being able to absorbed, based on this, above all carbon dioxide. An air 70, which is, on the whole, even drier, especially in terms of its water content and carbon dioxide content, can be provided hereby.

While specific embodiments of the invention have been shown and described in detail to illustrate the application of the principles of the invention, it will be understood that the invention may be embodied otherwise without departing from such principles.

APPENDIX:

List of Reference Numbers

10 Air-drying device
11 Air feed line
12 Air removal line
13 Analysis unit
14 Valve
15 Equalizing volume
16 Intermediate air line
20 Adsorption device
21 First adsorption section
22 Second adsorption section
23 Desiccant
24 Inlet opening
25 Outlet opening
30 Carbon dioxide sensor
40 Sensor device
50 Carbon dioxide absorber
60 Compressed air system
70 Air

What is claimed is:

1. A method for drying air, the method comprising the steps of:
providing air-drying device comprising: at least one adsorption device with a first adsorption section and with a second adsorption section, wherein the first adsorption section and the second adsorption section can be used alternatingly for drying the air; an air feed line and an air removal line, wherein the air feed line is for feeding air to be dried and is connected to an inlet opening of the adsorption device in a fluid-communicating manner and the air removal line is for removing dried air and is connected to an outlet opening of the adsorption device in a fluid-communicating manner; and an analysis unit;
feeding air to be dried, for drying, through the first adsorption section;
continuously determining a carbon dioxide content in the air exiting the first adsorption section during the step of feeding;
analyzing a result of the determination with the analysis unit, wherein short-term fluctuations of the determined content are taken into account during the step of analyzing a result of the determination by forming a mean value of the carbon dioxide content over periods of time during the step of feeding; and
ending the feed of air to be dried to the first adsorption section and feeding air to be dried for drying in the second adsorption section based on the step of analyzing taking into account the short-term fluctuations.

2. A method in accordance with claim 1, wherein the water content in the dry air is determined after the step of determining a carbon dioxide and downstream of the first adsorption section.

3. A method in accordance with claim 1, wherein a comparison of the determined mean value with an upper limit value or a lower limit value or with both an upper limit value and a lower limit value is carried out in the step of analyzing a result of the determination.

4. A method in accordance with claim 1, wherein forming a mean value over periods of time excludes a period of time near to a change of the adsorption section being used.

5. A method in accordance with claim 1, wherein the air to be dried is compressed before the step of feeding air to be dried for drying in the first adsorption section.

6. An air-drying device for drying air, the device comprising:
at least one adsorption device comprising:
a first adsorption section;

a second adsorption section, wherein the first adsorption section and the second adsorption section can be used alternatingly to dry the air;

an air feed line, for feeding air to be dried, connected to an inlet opening of the adsorption device in a fluid-communicating manner;

an air removal line, for removing dried air, connected to an outlet opening of the adsorption device in a fluid-communicating manner;

an analysis unit, wherein air to be dried is fed for drying in the first adsorption section;

at least one carbon dioxide sensor determining a carbon dioxide content in the air, wherein the analysis unit analyzes a result of the determination and ends the feed of air to be dried to the first adsorption section and feeds air to be dried for drying in the second adsorption section based on an analysis of a measurement result of the at least one carbon dioxide sensor by the analysis unit; and a carbon dioxide adsorber arranged in the air removal line, the carbon dioxide adsorber containing breathing lime.

7. An air-drying device in accordance with claim 6, wherein the air-drying device is configured to:

feed air to be dried for drying in the first adsorption section;

determine a carbon dioxide content in the air with the at least one carbon dioxide sensor;

analyze a result of the determination with the analysis unit; and end the feed of air to be dried to the first adsorption section and feed air to be dried for drying in the second adsorption section based on the analysis of the result of the determination.

8. An air-drying device in accordance with claim 7, further comprising an equalizing volume arranged in the air feed line.

9. An air-drying device in accordance with claim 7, wherein the carbon dioxide sensor is arranged in the air removal line at a distance from the adsorption device.

10. An air-drying device in accordance with claim 7, further comprising a sensor device for determining a content of at least one of the following components of the air:
water;
oxygen;
carbon monoxide;
oil;
sulfur dioxide; and
nitrogen oxide.

11. An air-drying device in accordance with claim 7, wherein the first adsorption section or the second adsorption section or both the first adsorption section and the second adsorption section contain a plurality of desiccants arranged in layers.

12. An air-drying device in accordance with claim 11, wherein at least one of the desiccants is selected from the list consisting of:
molecular sieve;
silica gel; and
activated alumina.

13. An air-drying device in accordance with claim 6, further comprising a further adsorption device comprising:
a first adsorption section;
a second adsorption section, wherein the first adsorption section and the second adsorption section can be used alternatingly to dry the air;

an air feed line, for feeding air to be dried, connected to an inlet opening of the adsorption device in a fluid-communicating manner;

an air removal line, for removing dried air, connected to an outlet opening of the adsorption device in a fluid-communicating manner; and an analysis unit, wherein the at least one adsorption device and the further adsorption device provide at least two adsorption devices arranged fluid mechanically in parallel or provide at least two adsorption devices arranged fluid mechanically in series or at least two adsorption devices arranged both fluid mechanically in parallel and fluid mechanically in series.

14. A compressed air system for providing compressed air, the compressed air system comprising an air-drying device comprising:

at least one adsorption device comprising:
a first adsorption section;
a second adsorption section, wherein the first adsorption section and the second adsorption section can be used alternatingly to dry the air;

an air feed line, for feeding air to be dried, connected to an inlet opening of the adsorption device in a fluid-communicating manner;

an air removal line, for removing dried air, connected to an outlet opening of the adsorption device in a fluid-communicating manner; and an analysis unit, wherein air to be dried is fed for drying in the first adsorption section; and at least one carbon dioxide sensor continuously determining a carbon dioxide content in the air in the removal line, wherein the analysis unit analyzes a result of the determination, including taking into account short-term fluctuations of the determined content by forming mean values of the carbon dioxide content in the dried air over periods of time during removal of the dried air, and ends the feed of air to be dried to the first adsorption section and feeds air to be dried for drying in the second adsorption section based on an analysis of a measurement result of the at least one carbon dioxide sensor by the analysis unit based on the formed mean values.

15. A compressed air system in accordance with claim 14, wherein the air-drying device is configured to:

feed air to be dried for drying in the first adsorption section;

determine a carbon dioxide content in the air with the at least one carbon dioxide sensor;

analyze a result of the determination with the analysis unit; and end the feed of air to be dried to the first adsorption section and feed air to be dried for drying in the second adsorption section based on the analysis of the result of the determination.

16. A compressed air system accordance with claim 15, further comprising a sensor device for determining a content of at least one of the following components of the air:
water;
oxygen;
carbon monoxide;
oil;
sulfur dioxide; and
nitrogen oxide.

17. A compressed air system accordance with claim 15, wherein the first adsorption section or the second adsorption section or both the first adsorption section and the second adsorption section contain a plurality of desiccants arranged in layers and at least one of the desiccants is selected from the list consisting of:
- molecular sieve;
- silica gel; and
- activated alumina.

18. A compressed air system accordance with claim 15, further comprising a further adsorption device comprising:
- a first adsorption section;
- a second adsorption section, wherein the first adsorption section and the second adsorption section can be used alternatingly to dry the air;
- an air feed line, for feeding air to be dried, connected to an inlet opening of the adsorption device in a fluid-communicating manner;
- an air removal line, for removing dried air, connected to an outlet opening of the adsorption device in a fluid-communicating manner; and
- an analysis unit, wherein the at least one adsorption device and the further adsorption device provide at least two adsorption devices arranged fluid mechanically in parallel or provide at least two adsorption devices arranged fluid mechanically in series or at least two adsorption devices arranged both fluid mechanically in parallel and fluid mechanically in series.

19. A compressed air system according to claim 15, wherein the analysis unit is configured to:
- control valves to control a feed of air to be dried for drying in the first adsorption section and to end the feed of air to be dried to the first adsorption section and feed air to be dried for drying in the second adsorption section based on the analysis of the result of the determination.

20. A compressed air system according to claim 19, wherein:
- the mean values are continuously formed during removal of the dried air;
- the periods of time are preselected; and
- the periods of time exclude a period of time near to a change of the adsorption section being used.

* * * * *